J. KELLER.

GARMENT TAG OR TICKET.

No. 10,186 Reissued Aug. 22, 1882.

Attest:
R. K. Smith
J. C. Turner.

Inventor
John Keller.
By his Atty R. D. Spencer.

UNITED STATES PATENT OFFICE.

JOHN KELLER, OF NEW YORK, N. Y.

GARMENT TAG OR TICKET.

SPECIFICATION forming part of Reissued Letters Patent No. 10,186, dated August 22, 1882.

Original No. 257,017, dated April 25, 1882. Application for reissue filed June 21, 1882.

*To all whom it may concern:*

Be it known that I, JOHN KELLER, of the city, county, and State of New York, have invented an Improved Garment Tag or Ticket, of which the following is a full, clear, and exact description, reference being had to the accompanying drawings, forming part of this specification.

In establishments where clothing is manufactured for sale as "ready-made" it is customary to give out at one time to one workman cut material for several similar garments, and at the same time to give to the workman an equal number of tailors' tickets to be sewed upon said garments. It is also customary in the trade to have said tickets printed in sheets or strips, so that the requisite number of tickets can be cut off unseparated, and thereby avoid liability to loss in the workman's hands pending the completion of the garments. It is also found that the workman will not observe any uniformity in the separation of tickets from the sheet nor in the stitching, whereby said tickets are attached to the garment, unless guided by marks, which render it easier to follow a uniform method than to depart from it. Manufacturers always prefer that these tickets shall be attached to the garment neatly and securely, and to that end instruct the workmen to clip the corners off, so that they shall not be liable to catch into other tickets or parts of the garments, and thus be torn off; but for easily-understood reasons stated above no uniformity can be secured in these respects when the matter is left to the discretion of the workmen. To secure these desirable results, and avoid waste in separating the tickets to be given out, I print them on a strip having a width equal to the one dimension of the ticket, with marginal notches.

I am aware that tickets for railroad purposes have heretofore been printed on strips, and that at the points of intended separations rows of perforations have been made, so that the tickets might be readily torn apart along said lines. These features do not constitute my invention, and I do not propose to claim them.

My invention consists, first, in a ticket-strip with marginal notches at the ends of the line of separation, whereby the detaching-cut is shortened and the corners are clipped; and, second, in a ticket with indentations or openings in its edges to receive the stitches, as and for the purpose hereinafter described.

Figure 1:
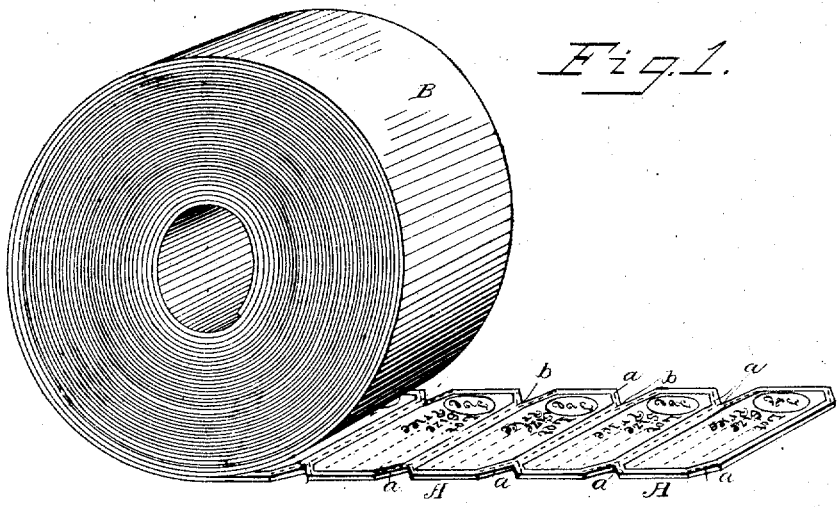
Figure 2:
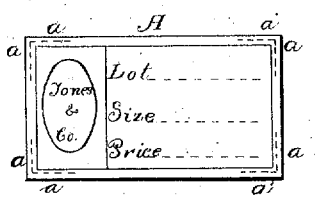
Figure 3:
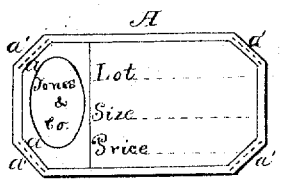

Figure 1 is a perspective of a coil of my improved tickets and embodying my invention. Figs. 2 and 3 show modifications of the forms of my improved ticket.

In fabricating my improved ticket I take preferably a strip or ribbon of paper or cardboard of a width substantially equal to one of the plain dimensions of the ticket, and of any desired length, and I imprint upon one face thereof and throughout its length, in duplication and succession, the ticket A, each ticket having the words, signs, or symbols employed in a tailor's ticket for marking completed garments. Each ticket has upon its edges the indentations or small openings *a*, and these are preferably formed only along the edges at the corners of the ticket. The object of these indentations or openings is to furnish stitching-holes through which the needle may be easily passed in fastening the ticket to the completed garment, and I find it desirable that they should be in form of indentations only, and they may be of such a depth that the material of the ticket is almost but not wholly destroyed or punctured where they occur, so that comparatively no resistance is offered to the needle in its passage through the ticket in sewing the same to the garment, while the ticket itself is not defaced before it is thus sewed upon the garment. The ticket-strip has indentations or notches *b* cut into its edges at regular intervals and exactly opposite each other. The sides of said notches form the clipped corners of the tickets, and the separation-line extends from the central angle of one notch directly across the strip to the corresponding angle of the opposite notch. The tickets thus formed and imprinted on the strip or ribbon are preferably wound into a coil, as shown at B, and in winding them it is preferable that the face of the tickets should be turned toward the center of the coil, as shown.

It is evident that the workman will be facilitated in attaching the ticket thus constituted to the garment by being enabled to readily form the fastening-stitches in the indentations on the edges of the ticket, and will also be less liable to deface the ticket in sewing it to the garment than he would if he had to exert the force upon the needle necessary to drive it through the material of the ticket as well as through that of the garment, the tickets being generally made of stiff and somewhat heavy card-board.

Tailors' garment-marking tickets constructed as described constitute an article of manufacture which is new and of great utility to tailors and their workmen.

Instead of beveling off the corners of the ticket to constitute an edge for the fastening-stitches, as shown in Fig. 3, the corners may be rounded, and the indentations for the fastening-stitches may be made along said rounded edge; or the corners may be made square, as shown in Fig. 2; but I prefer the form of ticket shown in Figs. 1 and 3, as a single straight edge is thus presented for the fastening-stitches.

Having described my invention, what I claim as new is—

1. As an improved article of manufacture, the ticket A, having the indentations or openings *a* along its edge, as and for the purpose specified.

2. A ticket-strip, B, provided with notches *b* in its edges at regular intervals and opposite each other, and printed with tickets in regular succession corresponding with the intervals between said notches, substantially as and for the purpose set forth.

3. As an improved article of manufacture, a series of tickets printed on a strip the width whereof corresponds with one of the plain dimensions of said ticket, provided with notches *b* in its edges at regular intervals, corresponding with the other plain dimension of said ticket, and marginal indentations *a*, as and for the purpose set forth.

JOHN KELLER.

Witnesses:
WM. KOCH,
JOHN A. ROE.